(No Model.)
E. J. HILL.
REEL.
No. 472,263. Patented Apr. 5, 1892.
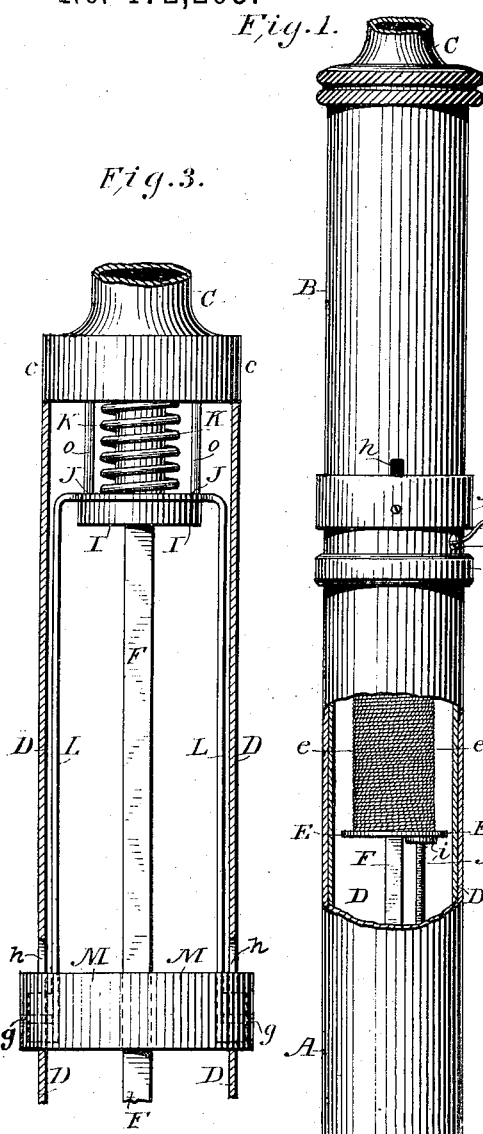
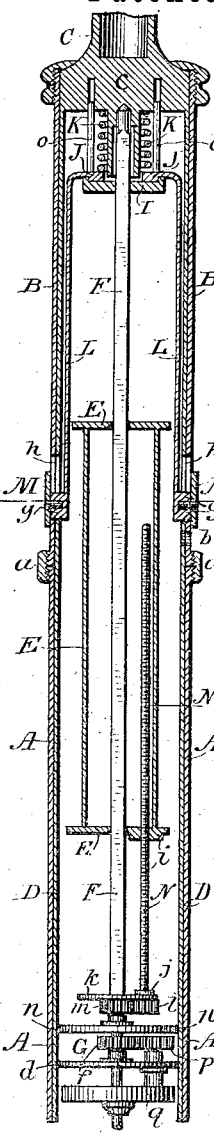
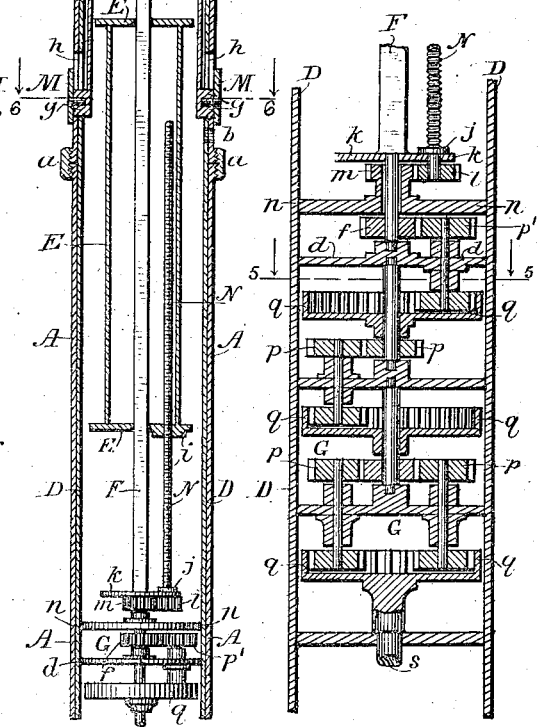
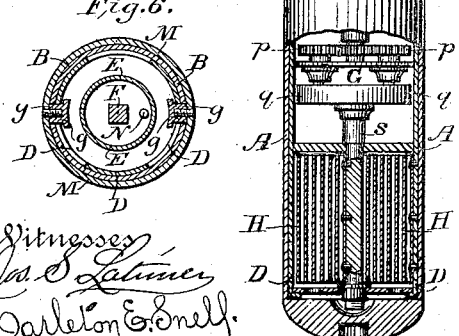
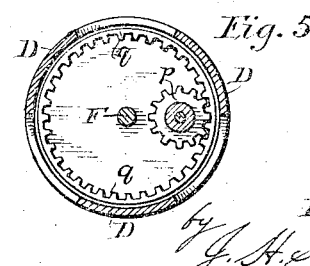
Witnesses:
Inventor
Edgar J. Hill
his Attorneys

UNITED STATES PATENT OFFICE.

EDGAR J. HILL, OF TROY, PENNSYLVANIA.

REEL.

SPECIFICATION forming part of Letters Patent No. 472,263, dated April 5, 1892.

Application filed July 2, 1891. Serial No. 398,237. (No model.)

*To all whom it may concern:*

Be it known that I, EDGAR J. HILL, of Troy, in the county of Bradford and State of Pennsylvania, have invented certain new and useful Improvements in Reels, of which the following is a specification.

The present invention relates to reels for fishing-lines; and it consists in a certain improved construction of reel and of operating mechanism therefor, said reel and operating mechanism being adapted to be entirely inclosed within the handle of a fishing rod or pole, and being constructed to automatically reel the line.

The invention is illustrated in the accompanying drawings, which show a detachable handle for a fishing-rod having the improved reel and its operating mechanism arranged therein.

Figure 1 is a face view, partly in section, showing portions of the handle broken away to disclose the interior parts. Fig. 2 is a view of a portion of the same partly in section. Figs. 3 and 4 are views, on a larger scale, of portions of the operating mechanism. Fig. 5 is a horizontal section on the line 5 5 in Fig. 4. Fig. 6 is a horizontal section on the line 6 6 in Fig. 2.

Referring to the drawings, A B is the fishing-rod handle, and C is a socket (of which but a fragment is shown) at the end thereof for the reception of the fishing-rod. As shown, the handle is provided with an outer and an inner metallic casing. The inner casing D carries within the reel and all of its operating mechanism. In practice this casing D is preferably cut away sufficiently to permit of ready access to the parts carried therein, as indicated in Figs. 5 and 6 of the drawings. The outer casing is in two sections A and B, which closely surround and inclose the inner casing, and are coupled together at $a$. The socket C is either secured at the upper end of the inner casing D, as shown, or it may form a continuation of the upper section B of the outer casing. The outer casing A B and the socket C are nickeled or otherwise finished so as to give a neat exterior to the handle.

Within the casing D is journaled the reel or winding-spool E, upon which the fishing-line $e$ is wound. The end of the fishing-line protrudes from the handle through an eye or aperture $b$, formed in the casings, and thence (when in use) the line extends upwardly through any suitable guides on the exterior of the rod. The winding-spool E is hollow, and is carried by a shaft F, which extends longitudinally of the casing and is journaled at its upper end in the top casing-wall $c$ and at its lower end in a fixed partition $d$, (see Fig. 4,) extending across the casing. The shaft F is loosely journaled, so that when the fishing-line is pulled through the aperture $b$ the winding-spool will revolve and the line be delivered therefrom.

In the lower portion of the casing D and beneath the fixed partition $d$ is located suitable gearing G, comprising pinions $p\ p$ and annular gear-wheels $q\ q$, properly secured within the casing and arranged to form a complete train of gearing, the upper member $p'$ of which is located just above the partition $d$ and co-operates with a gear-wheel $f$, carried by the shaft F near its lower end, and the lower member of which is acted upon, through shaft $s$, by the coiled spring H at the bottom of the casing. (See Fig. 1.) When the winding-spool E and its shaft F are rotated by the drawing out of the fishing-line through aperture $b$, the gear-wheel $f$ at the end of shaft F acts upon the pinion $p'$, and thus moves the gearing G and shaft $s$ in a direction to wind up the spring H. Thus the force expended in drawing the line off from the reel or winding-spool serves to wind up the spring H, the power thus stored in the spring being subsequently utilized to automatically reel the line, as hereinafter described.

When the drawing out of the line is suspended, the normal tendency of the spring H would be to at once reverse the gearing G and rotate the shaft F in the opposite direction, thus rewinding the line upon the spool, and consequently it is necessary to provide suitable means for controlling the rotation of the shaft F, so that the shaft will not be rotated by the action of spring H until such time as it is desired to rewind the line. Such controlling means for the shaft F are illustrated in Figs. 2 and 3 of the drawings and are as follows: The shaft F carries near its upper end a circular plate or disk I, which rotates with the shaft, being rigidly secured thereto. Above this plate or disk I is located a vertically-movable bearing-disk J, which is normally held in contact with the plate or disk I by a spring K. A downwardly-projecting cylindrical portion of the upper wall $c$ of the casing D surrounds the upper end of the shaft F and serves both as a guide for the vertically-movable bearing-disk J and as a core for spring K. The disk J may be provided with upwardly-projecting guide-pins $o$ $o$, as shown, which enter pin-holes in the casing-wall $c$ and assist in guiding the bearing-disk. The bearing-disk J by its co-operation with the circular plate I controls the rotation of shaft F, since the force of the spring K is such that while the shaft is rotated when the fishing-line is drawn from the winding-spool the shaft will not be rotated in the opposite direction (when the drawing out of the line has ceased) by the force of the spring H through gearing G. In other words, the friction between the disks I and J is overcome by the force employed in pulling out the line; but that friction is too great to be overcome by the spring H acting through the gearing G. Consequently when the fishing-line is pulled out it will remain unwound, ready for use. When, however, it is desired to reel the line, it is necessary that the bearing-disk J should be lifted out of contact with the plate I so as to release the shaft F, and thus permit the line to be automatically reeled by the action of the spring-actuated gearing G. For this purpose the disk J is provided with two or more legs L, which extend downwardly just within the casing D and carry at their lower ends outwardly-projecting lugs $g$. The lugs $g$ project through slots $h$ in the casings, the said slots being elongated to permit of a vertical movement of the lugs therein. The lugs $g$ normally occupy a lower position in the slots $h$, owing to the action of spring K upon disk J. Secured to the lugs $g$ and encircling the outer casing B is an annular band M, which is susceptible of a slight vertical movement permitted and limited by the play of lugs $g$ in slots $h$. The ring or band M being rigidly secured to the lugs $g$, it is evident that when the ring M is moved upward the legs L will be likewise elevated and the bearing-disk J raised out of contact with the disk I on shaft F. It will thus appear that the rotation of the shaft F may be controlled as desired by the simple manipulation of the exterior ring or band M. As long as the parts are left in their normal position the shaft F and winding-spool E remain passive and rotate only as they are moved by the drawing out of the line; but when it is desired to reel the line the ring or band M is pressed upward, thereby raising the bearing-disk J and releasing the shaft F, which is then rotated by the spring-actuated gearing G, and the line is wound upon the winding-spool.

It will be noted that the construction and arrangement of the gearing G is such that the winding-spool shaft is rotated at a high rate of speed by a comparatively slow rotation of the spring-actuated shaft $s$.

In order to render the improved reel practicable and satisfactory in its operation, it is necessary to employ special means for causing the line to be evenly wound upon the winding-spool and for facilitating the withdrawal of the line through the aperture $b$. Obviously if no such special means were provided the line could not be properly wound upon the spool, since when the line was drawn in through aperture $b$ it would have a tendency to wind only on the portion of the spool directly opposite the aperture, and thereby the inward passage of the line would be obstructed when only a portion of the line had been reeled. For this reason the winding-spool is arranged to move vertically on its shaft when the line is wound or unwound, so as to bring the various portions of the spool successively opposite to the aperture $b$. To permit the spool to be thus moved longitudinally on the shaft F and at the same time to rotate with the shaft, the shaft F is made square or angular (except at its extremities) and passes through correspondingly-shaped slots or apertures in the top and bottom of the spool. In the bottom of the spool, beside the central aperture through which the shaft F passes, is located a stationary nut or threaded sleeve $i$, through which passes a slender rod or shaft N, having a fine screw-thread, which engages with the internal thread of the sleeve $i$. The threaded shaft N extends upward from the sleeve within the hollow winding-spool E and extends downward from the sleeve to a point a short distance above the lower end of the shaft F. Near its lower end the threaded shaft N carries an annular flange $j$, which seats against a circular plate $k$, carried by the shaft F, said plate $k$ having an aperture for the passage of the end of shaft N. Below the plate $k$ the threaded shaft N terminates in a pinion $l$, which meshes with a similar pinion $m$, rigidly carried by a fixed partition $n$, extending across the casing D. The partition $n$ is located a short distance above the partition $d$, in which the lower end of shaft F is journaled, said partition $n$ being provided with a central aperture (which extends, also, through the stationary gear-wheel or pinion $m$) for the accommodation of shaft F.

The threaded shaft N and the pinions $l$ and $m$ serve to effect the longitudinal movement of the winding-spool in the following manner: When the winding-spool E and its shaft F are rotated in either direction, the gear-wheel $l$ at the end of the threaded shaft N is carried around the stationary gear-wheel $m$, with which it co-operates, thereby causing the gear-wheel $l$ and its shaft N to be rotated. By the rotation of the threaded shaft N the sleeve $i$ is caused to move longitudinally thereon, whereby the winding-spool is raised or lowered, as the case may be. The shaft N is very finely threaded, so that the winding or unwinding of the line *e* gives only a slow and gradual longitudinal movement to the spool, just sufficient to bring the various portions of the length of the spool successively opposite to the aperture *b*. As the result of this longitudinal raising and lowering of the winding-spool an even and proper winding of the line thereon is insured. It will be noticed that the flange *j* on the shaft N prevents the spool from sliding down on its shaft and maintains the pinion *l* in engagement with the stationary pinion *m*.

From the foregoing description the merits and advantages of the present invention will be very clearly understood. The reel and all of its operating and controlling mechanism are entirely inclosed within the fishing-rod handle, so as to be absolutely protected and out of the way. When the line is to be used, it is simply drawn out through the eye or aperture in the handle. To reel the line it is only necessary to give a slight upward pressure with the thumb and forefinger to the exterior band M, whereupon the line is automatically drawn in through the aperture under the influence of the spring-actuated gearing, as hereinbefore described; and by reason of the improved feeding mechanism for the spool the proper winding and unwinding of the line is satisfactorily insured.

I claim as my invention—

1. A fishing-rod handle provided with an aperture *b*, in combination with a reel entirely inclosed within said handle, consisting of a winding-spool carried by a rotatable shaft, a coiled spring H for effecting the automatic reeling of the line on said winding-spool, and multiplying gearing intermediate between said spring and said rotatable shaft, which acts to wind said spring when said shaft is rotated in one direction by the unreeling of the line and which acts to rotate said shaft in the opposite direction to reel the line when said spring is released, substantially as set forth.

2. A winding-spool carried by a rotatable shaft and a plate or disk I, carried by said shaft, in combination with mechanism for automatically rotating said shaft in one direction, and a bearing-disk J, independent of the winding-spool shaft, which normally bears against said plate or disk I and prevents the automatic rotation of said shaft, substantially as set forth.

3. A reel for fishing-lines, consisting of a winding-spool carried by a rotatable shaft, said shaft carrying a plate or disk I, a line secured to said winding-spool, and mechanism for automatically rotating said shaft in one direction to reel the line, in combination with a bearing-disk J, which normally bears against said plate or disk I and prevents the automatic rotation of said shaft, and means for moving said disk J out of contact with said disk I, whereby the automatic reeling of the line is controlled, substantially as set forth.

4. In a reel for fishing-lines, a rotatable shaft F, carrying a winding-spool E, mechanism for automatically rotating said shaft in one direction, a plate or disk I, secured to said shaft E, and a bearing-disk J, which normally bears against said plate or disk I and prevents the automatic rotation of said shaft, all of said parts being inclosed within the handle of a fishing-rod, in combination with means exterior to said handle for moving said disk J out of contact with said disk I, substantially as set forth.

5. The casing A B, constituting the handle of a fishing-rod, the rotatable shaft F, journaled within said casing and carrying the winding-spool E, mechanism for automatically rotating said shaft in one direction, a plate or disk I, secured to said shaft, and a bearing-disk J, which normally bears against said plate or disk I and prevents the automatic rotation of said shaft, in combination with legs L, secured to said disk J, having outwardly-extending lugs *g*, and a ring or band M, exterior to and sliding upon said casing A B and secured to said lugs *g*, whereby said bearing-disk J may be moved out of contact with said plate or disk I, substantially as set forth.

6. The rotatable shaft F and the winding-spool E, rotating with said shaft and capable of a longitudinal movement thereon, in combination with means controlled by the rotation of said shaft for moving said spool gradually toward one end of said shaft when the shaft is rotated in one direction and toward the other end of said shaft when the shaft is rotated in the opposite direction, substantially as set forth.

7. The rotatable shaft F, the spool E, rotating with said shaft and capable of a longitudinal movement thereon, and the threaded sleeve *i* on said spool, in combination with the threaded shaft N, extending through and co-operating with said sleeve *i*, the pinion *l*, rigidly secured to said shaft N, and the stationary pinion *m*, with which said pinion *l* meshes, whereby when said shaft is rotated in either direction the spool E is moved longitudinally thereon continuously in one direction, substantially as set forth.

8. The fishing-rod handle having the aperture *b* therein, the winding-spool E, rotatably mounted within said handle, and the line *e*, carried by said winding-spool and extending through said aperture *b*, in combination with mechanism, substantially as described, which, when said spool is rotated in either direction to wind or unwind the line, operates to move said spool longitudinally and continuously in one direction, whereby the several portions of the length of said spool are successively brought opposite to said aperture *b*.

9. A rotary shaft F and a spool E, rotating with said shaft and capable of a longitudinal movement thereon, in combination with a threaded shaft N, working in a threaded sleeve *i* on said spool and revolving with said spool about said shaft F, a pinion $l$, rigidly secured to said threaded shaft N, and a centrally-apertured stationary pinion $m$, surrounding said shaft F and meshing with said pinion $l$, whereby when said shaft F is rotated in either direction the pinion $l$ and shaft N are caused to rotate, thus moving the spool longitudinally upon its shaft, substantially as set forth.

In witness whereof I have hereunto signed my name in the presence of two subscribing witnesses.

EDGAR J. HILL.

Witnesses
P. N. BARKER,
RAY BALLARD.